United States Patent [19]  
Eiermann et al.

[11] Patent Number: 4,969,809  
[45] Date of Patent: * Nov. 13, 1990

[54] LUBRICATION SYSTEM FOR AN ECCENTRIC BEARING OF A ROTARY PISTON INTERNAL-COMBUSTION ENGINE

[75] Inventors: Dankwart Eiermann, Weissensberg-West; Hans-Jürgen Klusowski, Hergensweiler, both of Fed. Rep. of Germany

[73] Assignee: Wankel GmbH, Berlin, Fed. Rep. of Germany

[*] Notice: The portion of the term of this patent subsequent to May 16, 2006 has been disclaimed.

[21] Appl. No.: 275,345

[22] Filed: Nov. 23, 1988

Related U.S. Application Data

[63] Continuation-in-part of Ser. No. 197,994, May 24, 1988, Pat. No. 4,830,591.

[30] Foreign Application Priority Data

May 26, 1987 [DE] Fed. Rep. of Germany ....... 3717801  
May 25, 1988 [EP] European Pat. Off. .......... EPO88108319.0

[51] Int. Cl.$^5$ ............................................. F01C 21/04  
[52] U.S. Cl. ........................................................ 418/91  
[58] Field of Search ........................... 418/61.2, 91, 94; 184/16.16

[56] References Cited

U.S. PATENT DOCUMENTS

| 3,481,312 | 12/1969 | Bensinger | 418/91 |
| 4,403,927 | 9/1983 | Butterworth et al. | 184/6.16 |
| 4,830,591 | 5/1989 | Eiermann et al. | 418/94 |

FOREIGN PATENT DOCUMENTS 2062219  6/1972  Fed. Rep. of Germany ........ 418/94

Primary Examiner—Leonard E. Smith  
Assistant Examiner—John A. Savio, III  
Attorney, Agent, or Firm—Robert W. Becker & Asso.

[57] ABSTRACT

A lubrication system for a rotary piston internal-combustion engine of the trochoid type, including a roller or needle bearing for the rotor on the eccentric, wherein internal engine oil seals may be eliminated. A narrow annular clearance is provided between the shaft and the pinion of the synchromesh gearing, into which a dosed quantity of fresh oil may be pumped through the adjoining side part. At that side of this annular clearance which opens towards the eccentric, a splash edge is provided which is surrounded by a collector groove arranged at the eccentric. A passage in the eccentric leads from a radially outermost part of the collector groove towards the center of the rotor bearing. The pressurizing oil flowing into the annular clearance forces the oil to leave this space whereupon it is splashed off the splash edge under the action of the centrifugal force of the rotating shaft, and transferred into the collector groove from where it is passed through the bore in the eccentric into the rotor bearing.

7 Claims, 2 Drawing Sheets

LUBRICATION SYSTEM FOR AN ECCENTRIC BEARING OF A ROTARY PISTON INTERNAL-COMBUSTION ENGINE

BACKGROUND OF THE INVENTION

Related Patent Disclosure

The present case is a continuation-in-part of a copending related patent disclosure of allowed parent U.S. Ser. No. 197,994-Eiermann et al filed May 24, 1988, now U.S. Pat. No. 4,830,591—Eiermann et al issued May 16, 1989 to which reference can be made and which belongs to the assignee of the present invention.

Field of the Invention

The present invention relates to a lubrication system for an eccentric bearing in a rotary piston internal-combustion engine including a casing composed of two side parts and a rotor housing with a trochoidal surface as well as including an eccentric shaft that passes through the casing and that has an eccentric on which a multi-apex rotor orbits, under synchromesh gearing control, on roller or needle bearings.

Description of the Prior Art

In such engines, the bearing of the rotor on the eccentric and the gears of the synchromesh gear set are lubricated with cooling oil which is pumped from an oil circulation system through passages in the eccentric shaft through the rotor bearing into the spaces provided in the piston, so as to cool the rotor bearing. In another engine design, the lubricating oil is supplied together with the intake air and passed, together with the air, through the piston so as to cool the latter. In both cases, a high oil consumption is required while the bearing lubrication system lacks metering provisions; a specific arrangement is required so as to seal the working spaces to prevent oil from penetrating into the bearing and gearing space. Moreover, in both cases the oil is already heated when it enters the bearing of the rotor, either by the heat present in the oil circulation system or by the heat taken up by rotor cooling or by whirling, t he oil being soiled or contaminated in both cases.

SUMMARY OF THE INVENTION

The present invention is based on an object of supplying the rotor bearing with cool and fresh oil in dosed small quantities. The metered quantities should be so dimensioned or measured that the oil residue, which is left after use for bearing lubrication and which passes from the rotor bearing into the synchromesh gear space on the one hand, will still be sufficient to lubricate both the synchromesh gearing and the sealing elements of the working spaces. On the other hand, hardly any more oil penetrates into the working spaces.

In the engines of the type described by way of introduction, the solution of this problem is achieved with the measures in accordance with the present patent disclosure.

A specific advantage of the lubricating system, according to the present invention, resides in the fact that axial oil seals in the lateral rotor walls for retention of the oil inside the bearing and gearing space may be eliminated. The oil supply right in the center of the rotor bearing ensures a uniform lubrication of that bearing. Another advantage is achieved insofar as the present invention may be easily applied to engines which are shown and disclosed herein as well as to engines which include eccentric shafts having a hollow design.

BRIEF DESCRIPTION OF THE DRAWINGS

These and other objects and advantages of the present invention will appear more clearly from the following specification in conjunction with the accompanying drawings so that in the following, one embodiment of this invention will be described with reference to the drawings wherein.

DESCRIPTION OF PREFERRED EMBODIMENTS

Figure 1:
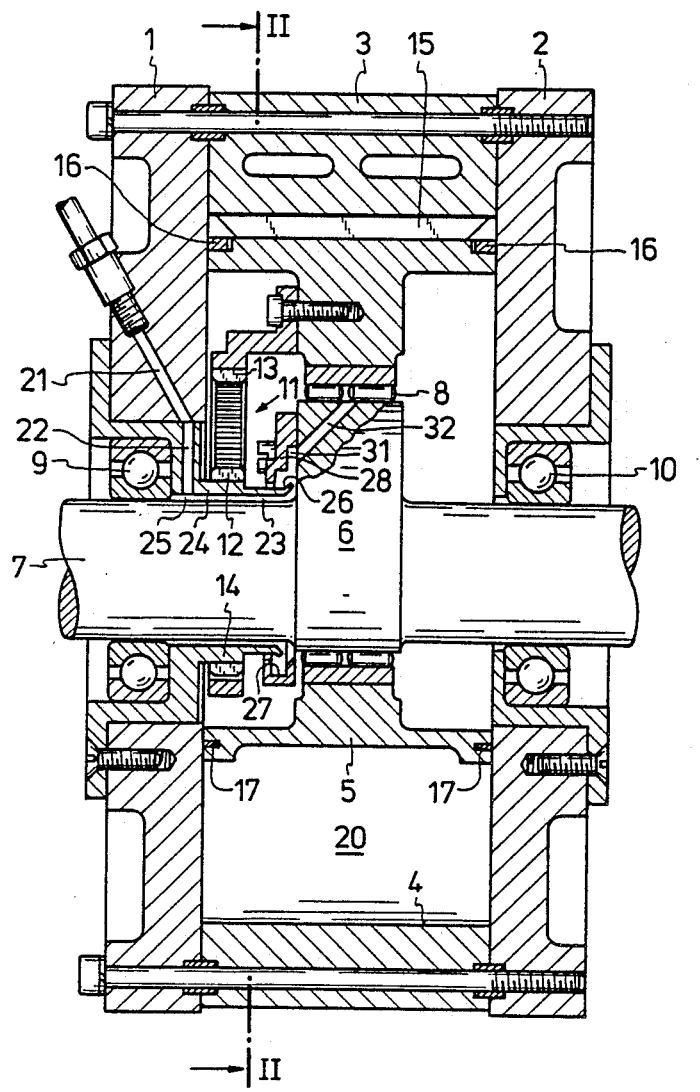
FIG. 1 is an axial sectional view taken through a rotary piston internal-combustion engine including the system for lubrication of the rotor bearing according to the present invention, taken along line I—I in FIG. 2.
Figure 2:
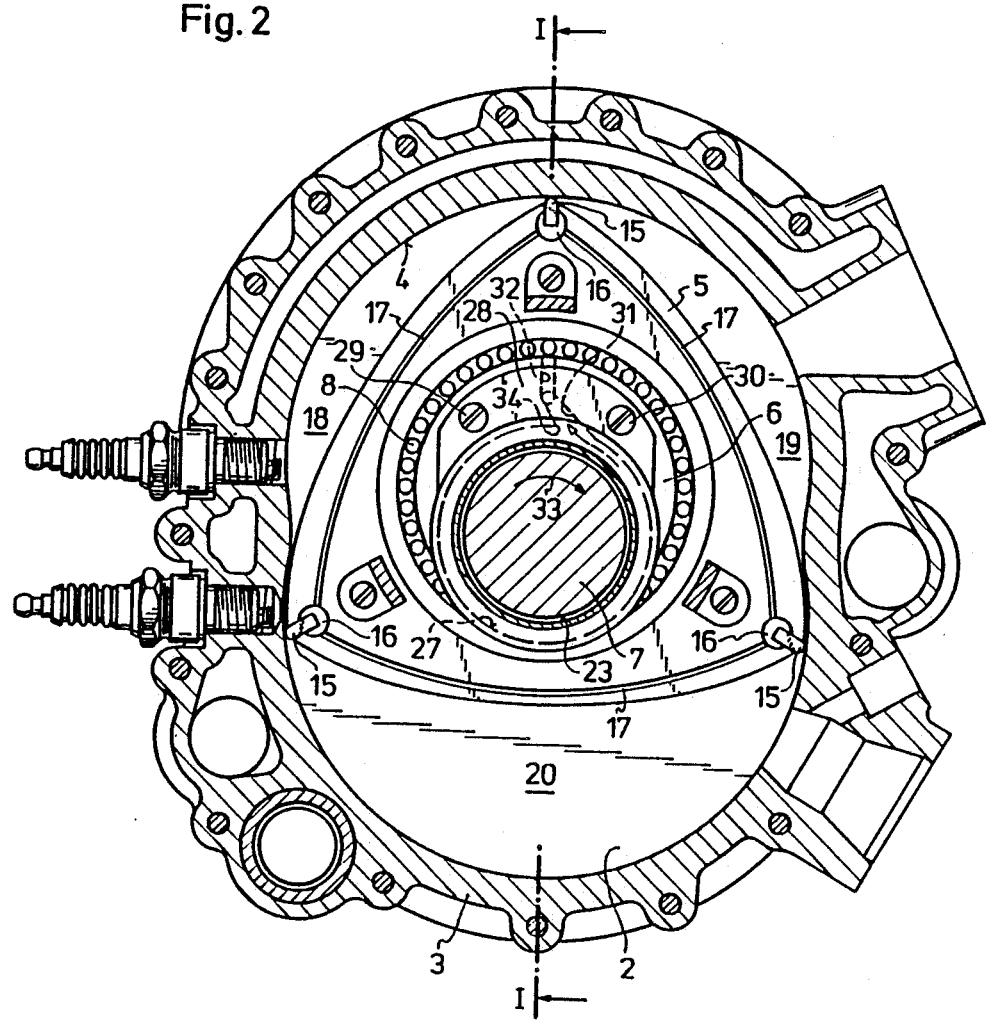
FIG. 2 is a radial section of the same engine taken along line II—II in FIG. 1.

The drawing illustrates a rotary piston internal-combustion engine of the trochoid design with a 2:3 step-up gearing ratio; the drawing provides a schematic illustration of the casing which is composed of the side parts 1 and 2 and the trochoid housing element 3. The trochoid housing element 3 is provided with a trochoid surface 4 of the housing on its inner side along which the apexes or apex corners of the rotor 5 are sliding in continuous contact therewith. The rotor 5 is supported on an eccentric 6 of a shaft 7 via a roller bearing 8. The shaft 7 passes through the lateral casing elements 1 and 2 in a vertical orientation while being supported in the latter at points 9 and 10.

The movement of the rotor 5 relative to the movement of the shaft 7 is under control of the synchromesh gearing 11 shown in FIG. 1; this synchromesh gearing includes the pinion 12 which is stationary in the side part 1 and the internal gear 13 is stationarily attached to the rotor. The pinion 12 surrounding the shaft is fastened at an insert 14 which houses the shaft bearing 9 and which is screwed into the side part 1. The insert 14 closes the opening in the side part 1 through which the eccentric 6 may be pushed during assembly. Sealing elements are provided at the rotor, i.e. radial ledges 15, sealing bolts 16 and axially sealing side strips 17, which seal the working spaces 18, 19, 20, both from each other and from the inner engine space.

A supply passage 21 for the oil lubricating the rotor bearing 8 is disposed in the side part 1. This passage communicates with an additional bore 22 in the insert, which passes up to the surface of the shaft 7 and there opens into a narrow annular clearance 23 between the sleeve 24 bearing the pinion 12 and forming an axial inward extension of the insert 14 and the shaft 7. The gap formed by this annular clearance 23 must be wider than the annular gap 25 between the shaft and the section 25 of the insert 14 which is located outside (i.e. in the left part of the drawing) the opening of the additional bore 22, so as to prevent the oil from penetrating in a direction toward the shaft bearing 9. The annular clearance between the shaft and an insert has a width in the range of 0.1 to 0.2 mm while an annular gap between the insert and the shaft has a width in a range of 0.05 mm or less in the zone axially outside of the annular clearance.

The sleeve 24 supporting the pinion 12 projects beyond the latter and is conically flared at its right end (in the drawing) so as to form a splash edge 26. The pressurizing oil in the annular clearance 23 passes the oil supplied through the bores 21, 22 in a direction towards the eccentric 6, whereupon, having reached the splash edge 26, the oil is obliquely splashed outwardly onto the left side wall of the eccentric 6 due to the centrifugal force created by the rotary movement of the shaft 7.

On the right side wall of the eccentric 6, which faces the splash edge 26, a collector groove 27 is provided which surrounds the shaft 7 and is concentric relative to the latter; this collector groove opens radially inwardly and takes up all the oil splashed off at the splash edge 26. The collector groove 27 is provided at a flat element 28 which is screwed to the side wall (on the left side of the drawing) of the eccentric 6 at points 29 and 30. A radially outwardly extending narrow pocket 31 is provided in that side of the flat element 28 which is in contact with the eccentric; this pocket in turn communicates, on the one hand, with the collector groove 27 and, on the other hand, through its radially outward hand with a bore 32 leading to the axial center of the roller bearing 8 through the eccentric.

The end edge 34 of the pocket 31, which is trailing in the direction of rotation of the shaft 7 as indicated by the arrow 33, is extended forward in the direction of rotation so that, when the engine is accelerated, the oil collected in the pocket 31 cannot flow back counter or opposite to the direction of rotation under the influence of inertia. The centrifugal force created by the shaft 7 will force the oil splashed off the splash edge 26 into the collector groove 27 to flow into the pocket 31 and from there into the bore 32 through which it is passed into the axial center of the roller bearing 8. The oil is then distributed from there to both sides all over the bearing 8 in such a way so that roughly half of the oil quantity supplied will be consumed there. The residual oil leaves the bearing 8 at the sides thereof and passes into the synchromesh gearing space and into the inner space of the rotor 5 on the right side (see drawing) of the eccentric 6; the oil quantity entering there is sufficient to lubricate both the synchromesh gearing 11 and the sealing elements 14, 15, 16 of the rotor 5 while hardly any more oil is allowed to penetrate into the working spaces 18, 19, 20. The oil quantity supplied to this lubricating system through the passage 21 is controlled as a function of the rotary shaft speed by a metering pump which is not illustrated in the drawing.

The present invention is, of course, in no way restricted to the specific disclosure of the specification and drawings, but also encompasses any modifications within the scope of the appended claims.

WHAT WE CLAIM IS:

1. A lubrication system for an eccentric bearing in a rotary piston internal-combustion engine including a casing composed of two side parts and a rotor housing with a trochoidal surface, through which casing an eccentric shaft is passed on whose eccentric multi-apex rotor orbits, under synchromesh gearing control including a synchromesh gearing therewith, on roller or needle bearings, said system comprising:

an arrangement including a pinion and an insert bearing the pinion of the synchromesh gearing which forms an annular clearance around the shaft, which opens toward the eccentric and into which opens a bore for the supply of fresh oil; and on the side of the synchromesh gearing, on the eccentric, a collector groove is provided to collect the oil splashed off at the end of the annular clearance, which groove is located concentrically relative to the shaft and which opens radially inwardly while a radially outward zone thereof communicates with an axial center of the rotor bearing via a passage in the eccentric.

2. A lubrication system according to claim 1, wherein a rim with a splash edge is provided at an open side of said annular clearance, which edge flares conically towards the outside and projects beyond the pinion while said collector groove covers this splash edge.

3. A lubrication system according to claim 2, wherein said collector groove is closed and passes around the shaft.

4. A lubrication system according to claim 1, wherein said collector groove is provided with a radially outwardly directed pocket into whose radially outermost zone opens a bore in the eccentric, which leads to a radial center of the rotor bearing.

5. A sealing arrangement for the lubrication system according to claim 4, wherein an edge trailing in a direction of rotation of the shaft is extended forward of a pocket of the radial outward zone in the direction of rotation of the shaft.

6. A lubrication system according to claim 5, wherein said collector groove is disposed at a flat element screwed onto said eccentric and comprising said pocket on its inner side.

7. A lubrication system according to claim 1, wherein said annular clearance between the shaft and an insert has a width in the range of 0.1 to 0.2 mm while an annular gap between said insert and said shaft has a width in a range of 0.05 mm or less in the zone axially outside of said annular clearance.

* * * * *